(12) United States Patent
Hou

(10) Patent No.: US 8,924,952 B1
(45) Date of Patent: Dec. 30, 2014

(54) UPDATING SOFTWARE UTILIZING MULTIPLE PARTITIONS

(75) Inventor: Xuefeng Hou, Fremont, CA (US)

(73) Assignee: Amazon Technologies, Inc., Reno, NV (US)

(*) Notice: Subject to any disclaimer, the term of this patent is extended or adjusted under 35 U.S.C. 154(b) by 128 days.

(21) Appl. No.: 13/534,447

(22) Filed: Jun. 27, 2012

(51) Int. Cl.
G06F 3/00 (2006.01)
G06F 12/00 (2006.01)
G06F 9/44 (2006.01)
G06F 9/445 (2006.01)

(52) U.S. Cl.
USPC ............ 717/172; 710/1; 711/153; 711/162; 711/202; 717/168; 717/169; 717/170; 717/175

(58) Field of Classification Search
CPC ............ G06F 8/65; G06F 8/67; G06F 8/665; G06F 9/44; G06F 9/52; G06F 9/5077; G06F 11/00; G06F 11/1433
See application file for complete search history.

(56) References Cited

U.S. PATENT DOCUMENTS

| | | | |
|---|---|---|---|
| 6,314,501 B1 * | 11/2001 | Gulick et al. | 711/153 |
| 7,000,229 B2 * | 2/2006 | Gere | 717/169 |
| 7,543,168 B1 * | 6/2009 | Thompson et al. | 717/168 |
| 2003/0084206 A1 * | 5/2003 | Floman et al. | 710/1 |
| 2004/0117414 A1 * | 6/2004 | Braun et al. | 707/204 |
| 2004/0162955 A1 * | 8/2004 | Jones et al. | 711/162 |
| 2006/0075207 A1 * | 4/2006 | Togawa et al. | 711/202 |
| 2007/0180206 A1 * | 8/2007 | Craft et al. | 711/162 |
| 2009/0138865 A1 * | 5/2009 | Furbee et al. | 717/168 |
| 2011/0145807 A1 * | 6/2011 | Molinie et al. | 717/170 |
| 2013/0167140 A1 * | 6/2013 | Androncik et al. | 717/175 |
| 2013/0263105 A1 * | 10/2013 | Cornwell et al. | 717/168 |

* cited by examiner

*Primary Examiner* — Don Wong
*Assistant Examiner* — Anibal Rivera
(74) *Attorney, Agent, or Firm* — Novak Druce Connolly Bove + Quigg LLP

(57) ABSTRACT

A computing device includes a data store having two or more partitions. A first partition can be used to store information, to host a first operating system, and to perform computing tasks requested by a user. The computing tasks can be performed by the first operating system and can use/manipulate the stored information. The computing device can communicate over a network with a software server to determine whether a software update for the computing device is available for download. The software update can be downloaded into the second partition autonomously from the computing tasks being performed by the first operating system in the first partition. The downloaded software update can also be installed into the second partition autonomously from the computing tasks being performed. When the device is rebooted, either the first operating system or the second operating system (if the installation was successful) can be booted.

25 Claims, 6 Drawing Sheets

UPDATING SOFTWARE UTILIZING MULTIPLE PARTITIONS

BACKGROUND

Computing devices such as smartphones, laptops, and tablet computers are becoming increasingly popular. Periodic updating of software (e.g., firmware updates) for a computing device has become commonplace. Typically, when a user wants to update his/her software, firmware, and/or operating system, the user is prevented from operating the device, but instead, the device focuses only on completing the update. In other words, conventional approaches typically prevent the user from using his/her device when software is being (downloaded and/or) installed. For example, during (the download and/or) the installation of the software, the user cannot use his/her device to surf the Web, check email, send text messages, or purchase goods. Various computing tasks are paused and/or terminated so that the computing device can focus on (downloading and/or) processing and/or installing the downloaded software. Further, the process for undoing an update is often complicated, and in some cases an update cannot be undone without completely reinstalling the previous version and manually making any other necessary changes.

BRIEF DESCRIPTION OF THE DRAWINGS

Various embodiments in accordance with the present disclosure will be described with reference to the drawings, in which.

DETAILED DESCRIPTION

Figure 1:
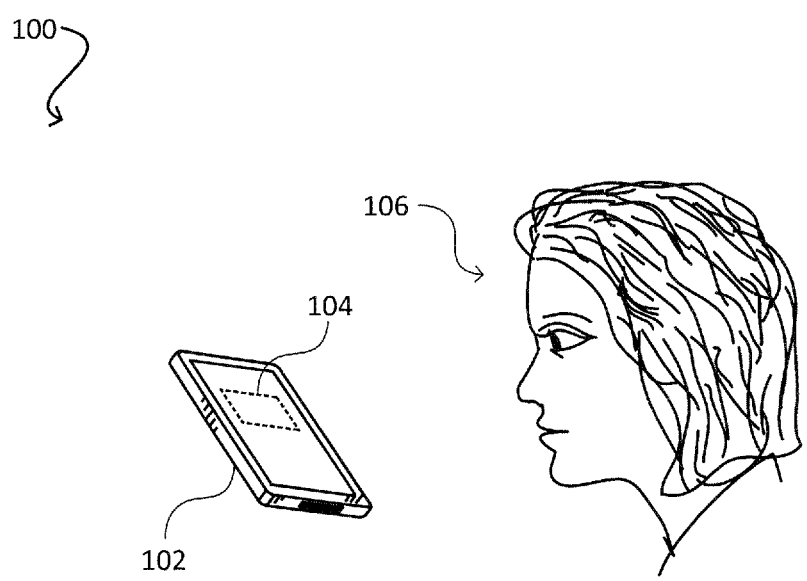
FIG. 1 illustrates an example environment in which aspects of the various embodiments can be utilized.

Systems and methods in accordance with various embodiments of the present disclosure overcome one or more of the above-referenced and other deficiencies in conventional approaches to updating software. Various embodiments attempt to partition a data store of a computing device into two or more partitions. One partition can be used to store a first operating system as well as information that is used/manipulated during computing tasks performed by the first operating system. For example, the first partition can store content data (e.g., files, documents, music, video, pictures), index data (e.g., data for indexing purposes), profile data (e.g., names, addresses, contact information), preference data (e.g., settings, options), etc. as well as the first operating system. The first operating system in the first partition can perform various computing tasks related to surfing the Web, executing an application, sending messages, playing media, etc., at least some of which rely on use/manipulation of the stored information in the first partition.

A second partition can be used to store software for a second operating system. The software can be downloaded over a communication network from a software server. The software can be an installation file for an entire, new second operating system, or it can be an update to an existing second operating system. In some embodiments, the second operating system in the second partition can be a copy of the first operating system in the first partition. In some embodiments, the second operating system can but need not be actually copied from the first operating system, but rather the operating systems can be the same version or the same OS product, etc. In some embodiments, a software update applied to the second operating system can result in the second operating system being an upgraded version of the first operating system. The download and installation of the software for the second operating system can occur within the second partition and can be autonomous from (e.g., independent of, non-disruptive of) the computing tasks of the first partition. For example, a user can be using his/her device to watch a movie (e.g., utilizing the first partition) with minimal interference from the download and/or installation of the software for the second operating system in the second partition. In some embodiments, the download and installation can occur automatically. In some embodiments, the download and installation of the software can be dependent upon a user's decision/selection to approve the download and/or installation.

Upon a reboot of the computing device, a decision can be made to boot the (software for the) second operating system in the second partition if the installation was successful, or boot the first operating system in the first partition. If there are one or more errors with the (software for the) second operating system or if the user does not like it, he/she can choose to boot (e.g., revert back) to the first operating system in the first partition. In some embodiments, a reboot can be initiated by pressing a reset key on the computing device (e.g., holding down the reset key for a certain amount of time).

FIG. 1 illustrates an example environment 100 in which aspects of the various embodiments can be utilized. In some embodiments, the example environment 100 can include a computing device 102 which comprises, among other components, a data store 104. The data store 104 can be an electronic memory storage device (i.e., memory device) capable of storing information. A user 106 of the computing device 102 can use the device 102 to perform various computing tasks, including tasks related to surfing on the Internet, sending and receiving messages, listening to music, watching videos, executing applications, etc.

In some embodiments, software for the computing device 102 may be available for download. The software can be downloaded and stored in the data store 104 of the device 102. In some embodiments, the software can be a firmware update to upgrade an operating system (OS) of the computing device 102. In some embodiments, the software can be an entire operating system packaged into a software file. Upon downloading the software, the software can be installed on the computing device 102.

In some embodiments, the data store 104 can be partitioned into two or more partitions, at least a first partition and a second partition. The partitioning can be performed previously or dynamically. For example, prior to downloading and installing the software, the computing device 102 could have already partitioned its data store 104 into a first partition and a second partition. In another example, the partition could have been done during the manufacturing process. In a further example, the computing device 102 can also dynamically partition the data store 104 upon initialing the download of the software; the device 102 can also notify and confirm with the user 106 whether or not he/she wants to partition the data store 104 and initialize the software download and installation. In some embodiments, the software can be downloaded, stored, and installed utilizing the second partition of the data store 104 while other computing tasks can be simultaneously performed utilizing the first partition.

In some embodiments, a partition can be a logical storage unit of a hard disk drive. Multiple partitions on the hard disk drive can be treated as if they were multiple disks. In some embodiments, a partition can be a division of a logical database or its constituting elements into distinct independent parts. In some embodiments, a partition can be a contiguous area of primary memory divided into multiple areas. Each partition can contain all the information for a specific job or task. A task/job can be allocated to a partition when the job/task starts and unallocated when the job/task ends. Multiple tasks/jobs can be prevented (e.g., using hardware support) from interfering with one another and/or with one or more operating systems. In some embodiments, a partition can be a logical partition (i.e., LPAR), which is a subset of a computing device's hardware resources, virtualized as a separate computing device. In some embodiments, a computing device can be partitioned into multiple partitions, each hosting a separate operating system.

Figure 2:
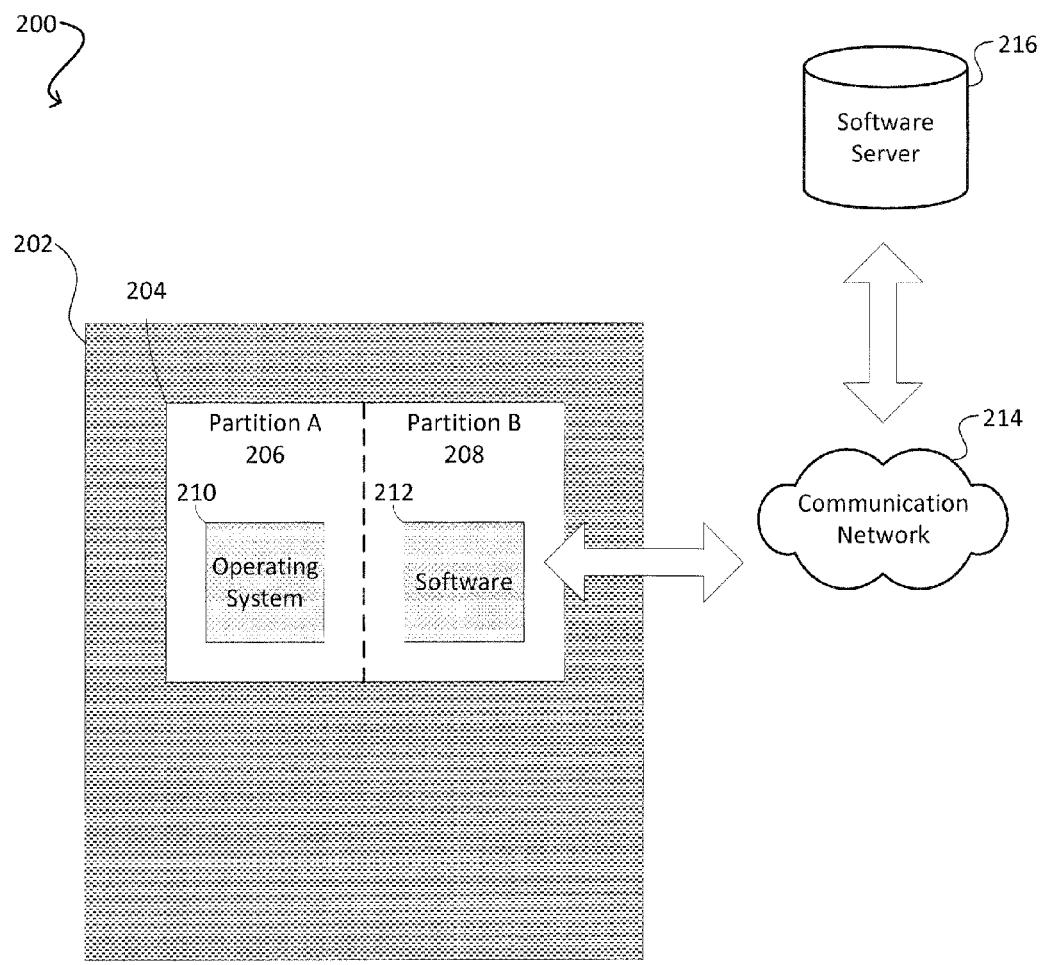
FIG. 2 illustrates an example system embodiment for updating software utilizing multiple partitions.

FIG. 2 illustrates an example system embodiment 200 for updating software utilizing multiple partitions. In the example system embodiment 200, there can be a computing device 202, a communication network 214, and a software server 216. The computing device 202 can comprise a data store 204. The data store 204 can be partitioned, for example, into a first partition 206 (e.g., Partition A) and a second partition 208 (e.g., Partition B). In some embodiments, an operating system 210 of the computing device 202 can be stored in Partition A 206. Various computing tasks can be performed by the operating system 210 utilizing Partition A 206. These computing tasks include, but are not limited to, running one or more applications, sending and receiving messages, playing media, etc. Moreover, content data, index data, profile data, and preference data can also be stored in Partition A 206 and used/manipulated in performing the various computing tasks. Storing content data, index data, profile data, preference data. etc. in Partition A 206 can maintain data integrity in the case that Partition B 208 is corrupted, erroneous, or fails. Data integrity generally refers to the correctness, consistency, accuracy, and/or quality of data. Data integrity can be maintained with the help of integrity constraints, which can be rules designed to keep data consistent and correct. In some embodiments, data integrity can be maintained utilizing error detection and/or correction software. For example, error checks, such as checksums and hash sums, and/or hardware/software error correction can be utilized to maintain data integrity and preserve the accuracy of the data.

In some embodiments, content data, index data, profile data, or preference data can be stored and maintained in one partition (e.g., either the first or the second partition), multiple partitions (e.g., the first and the second partitions), and/or be distributed from one partition to another. In some embodiments, the content data, index data, profile data, or preference data can be stored and maintained in a partition dedicated for holding such data.

In some embodiments, the computing device 202 can communicate with a software server 216 over a communication network 214, such as the Internet. The software server 216 can detect whether or not software is available for the computing device 202 to download. If software is available for download, the server 216 can notify the device 202. In some embodiments, the device 202 can automatically download the software upon receiving information from the server 216 that the software is available. The available software can be downloaded into (and stored in) the second partition 208 (e.g., Partition B) such that the downloading can be autonomous from (e.g., independent of, minimally interfering with, etc.) the computing tasks performed by the operating system in the first partition 206 (e.g., Partition A). Upon downloading the software into the second partition, the computing device 202 can automatically install the downloaded software in the second partition. The installation of the downloaded software in the second partition can be autonomous from the computing tasks performed by the operating system in the first partition.

For example, a user of the computing device 202 can be playing a game on his/her computing device. The game can be run by the operating system 210 in the first partition 206 of the data store 204 of the device 202 and can utilize information and/or resources in the first partition 206. Without interrupting the game being played by the user, the device 202 can automatically communicate with a firmware server 216 via WiFi access to the Internet 214. The device 202 and server 216 can exchange information and determine that there is a firmware update available for download by the device 202. Still without pausing or otherwise interfering with the game being played, the device 202 can automatically download and store the firmware update 212 in the second partition 208. Upon downloading the firmware update file 212, the computing device 202 can automatically install the firmware update 212 in the second partition 208 without disturbing the game being played.

Continuing with the example, next time the user reboots his/her device 202, the device 202 can hoot the installed firmware update 212 in the second partition 208 if the installation was successful. If, however, there is a problem with the firmware update 212, then the device 202 can boot from the first partition 206 with the operating system 210 without the firmware update 212. In some embodiments, the device 202 can allow the user to choose to boot the installed software 212 in the second partition 208 (assuming the installation was successful) or the operating system 210 in the first partition 206.

In some embodiments, after successful installation and boot of second partition, the first operating system becomes a redundant copy. The first operating system as the redundant copy can receive a future software update and the computing device can switch/revert back to using the first operating system, and can thus make the second operating system the redundant copy (and so forth). In some embodiments, the switching can automatically occur after a successful boot and/or after the user selects to switch.

Figure 3:
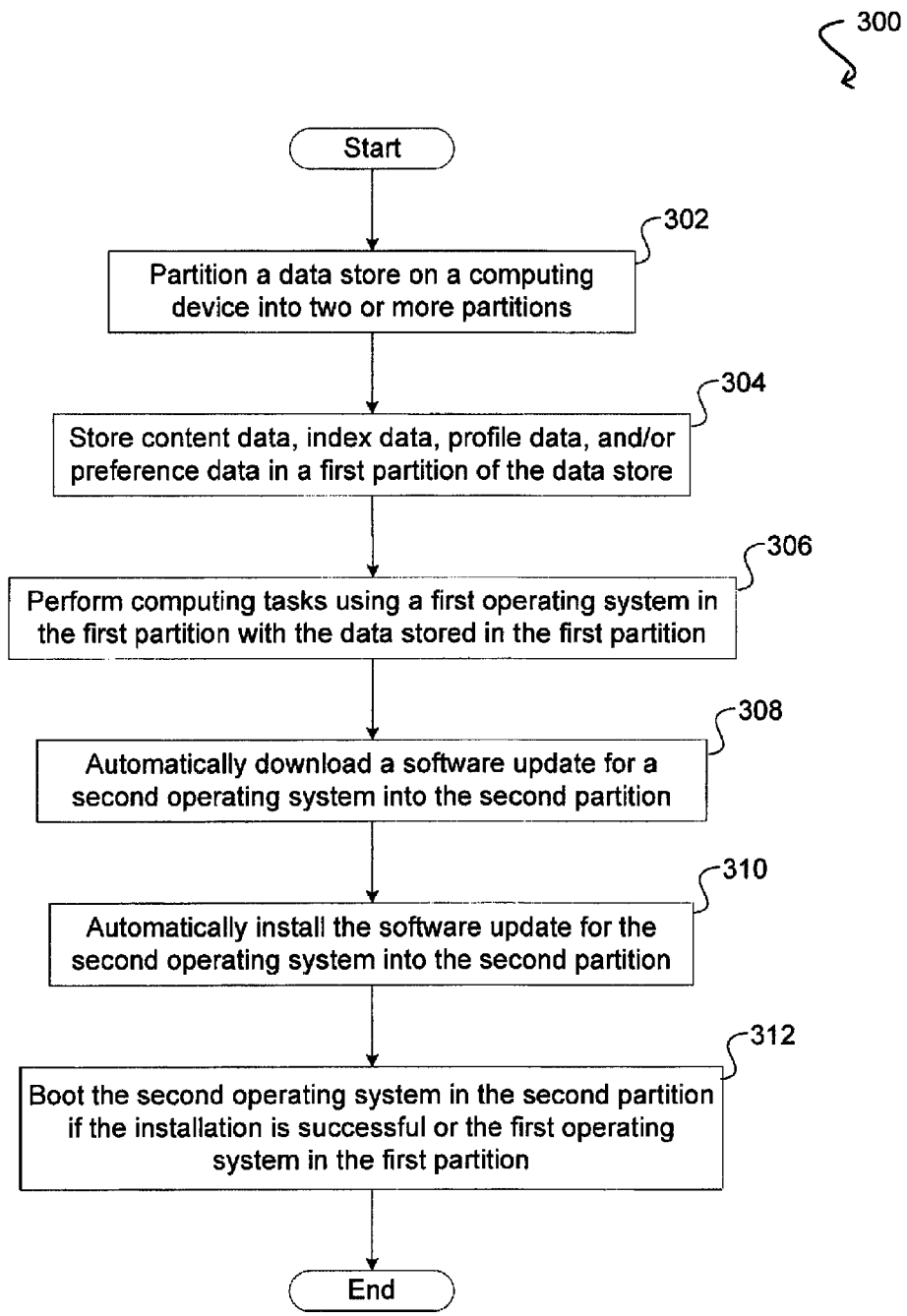
FIG. 3 illustrates an example method embodiment for updating software utilizing multiple partitions.

FIG. 3 illustrates an example method embodiment 300 for updating software utilizing multiple partitions. It should be understood that there can be additional, fewer, or alternative steps performed in similar or alternative orders, or in parallel, within the scope of the various embodiments unless otherwise stated. At step 302, the example method embodiment 300 can partition a data store of a computing device into multiple partitions, such as a first partition and a second partition. For example, a computing device can already have a (e.g., fixed) partitioned data store when purchased or the computing device can partition its data store sometime after the purchase. At step 304, the example method embodiment 300 can store at least one of content data, index data, profile data, or preference data in the first partition of the data store. For example, any files, documents, media (e.g., songs, videos, pictures, etc.), personal settings, contact information, application data, etc. (e.g., data associated with a user of the device) can be stored in the first partition. The method embodiment 300 can perform one or more computing tasks using a first operating system in the first partition by manipulating (e.g., using, altering, etc.) at least one of the content data, the index data, the profile data, or the preference data, at step 306. For example, the first operating system in the first partition can allow the user to perform various computing tasks, such as viewing/editing a document, listening to music, recording a video, running an application, engaging in communication, etc.

At step 308, the method embodiment 300 can automatically download a software update for a second operating system over a wireless communication network into the second partition. For example, the computing device using cellular data transmission or WiFi can communicate with a software server through the Internet. It can be determined that software for the computing device is available for download by the device. The device can automatically download the software into its second partition using cellular data transmission or WiFi. The download can be autonomous from (e.g., independent of, non-disruptive of, non-interfering with respect to, etc.) the performance of the one or more computing tasks using the first operating system in the first partition.

At step 310, the software update for the second operating system can be automatically installed into the second partition. For example, while the device is still performing the one or more computing tasks using the first operating system in the first partition, the software can be automatically installed in the second partition autonomously from the performance of the one or more tasks. In other words, for example, if a user is using the computing device to execute an application, to surf the web, to send a text message, etc., the software installation can be non-disruptive or minimally disruptive with respect to the user's use of the device, as the software installation occurs in the second partition while the user's use of the device occurs within the first partition.

At step 312, the example method embodiment 300 can allow a user of the computing device, during a reboot of the computing device, to choose to boot either the second operating system if the installation of the software update for the second operating system is successful or the first operating system if there is an error with the second operating system. For example, on the next reboot of the device, the user can be given the choice to either boot the first operating system (e.g., the one that he/she has been using up to this point) or the second operating system if it was successfully installed. In some embodiments, the user can be notified once the second operating system is successfully installed (e.g., perhaps prior to the next reboot). Moreover, the user can still choose to boot the first operating system, especially if, for example, there is a problem with the second operating system.

Figure 4:
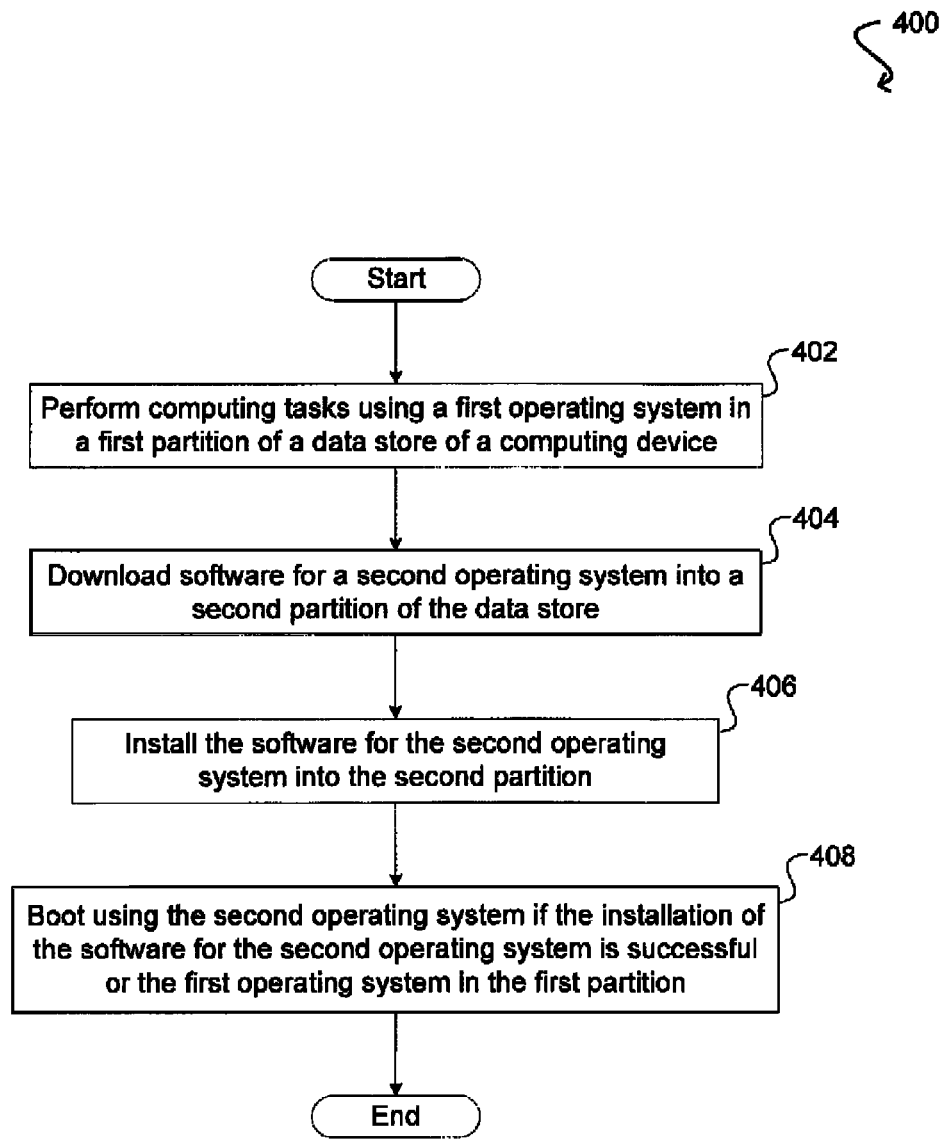
FIG. 4 illustrates an example method embodiment for updating software utilizing multiple partitions.

FIG. 4 illustrates an example method embodiment 400 for updating software utilizing multiple partitions. It should be understood that there can be additional, fewer, or alternative steps performed in similar or alternative orders, or in parallel, within the scope of the various embodiments unless otherwise stated. The example method embodiment 400 begins with performing one or more computing tasks using a first operating system in a first partition of a data store of a computing device based at least in part upon information stored in a first partition of a data store of the computing device, at step 402. For example, a data store of a computing device can be partition such that instructions, content data, and/or other information needed for performing certain computing tasks can be stored in the first partition with the first operating system.

There can also be a second partition into which software for a second operating system is downloaded, at step 404. In some embodiments, the software can be an update to the second operating system. In some embodiments, the software can be an entire installation file for the second operating system. The software can be download by the computing device over a communication network (e.g., Internet) using cellular data transmission (e.g., 2G, 3G, 4G, LTE, etc.), WiFi, LAN, Bluetooth, etc. In some embodiments, the downloading can occur at the same time as the computing tasks are performed by the first operating system in the first partition. The software can be downloaded into the second partition with minimal interference to the performance of the computing tasks by the first operating system in the first partition.

In some embodiments, the download of the software 404 can be performed automatically via a wireless communication network (e.g., over-the-air (OTA) software update). In some embodiments, the device can notify the user of the available software and allow the user to decide whether or not to download. Furthermore, the user can choose to download over-the-air wirelessly or use a wired approach such as by manually connecting the computing device with a desktop/laptop computer using a physical cable and downloading the software from the desktop/laptop computer.

At step 406, the method embodiment 400 can install the software for the second operating system into the second partition. For example, while the computing tasks are being performed by the first operating system in the first partition, the software for the second operating system can be installed into the second partition with minimal disturbance to the tasks performed. In some embodiments, the method 400 can request confirmation from the user to install the software. In some embodiments, the method 400 can automatically install the downloaded software.

At step 408, the example method embodiment 400 can boot the second operating system if the installation of the software for the second operating system is successful or the first operating system. For example, on the next reboot, the computing device can boot the second operating if it was successfully installed or the first operating system, especially if there is a problem with the second operating system.

In some embodiments, the choice of booting the first operating system or second operating system can be given to the user of the computing device. For example, there can be a menu for the user to decide which operating system to boot. In some embodiments, the computing device can comprise a reset key. If the user presses this key (e.g., holds the key down for a specified amount of time), then the device caused to perform a reboot. During the reboot, a menu for the user can allow him/her to select whether he/she would like to boot using the first operating system in the first partition or using (the newly installed software for) the second operating system in the second partition. In some embodiments, there can also be a safe mode which allows the user to boot using a set of default parameters known to be working (e.g., original factory settings). The set of defaults parameters can be stored in at least one of the multiple partitions. In some embodiments, the set of defaults parameters can be stored in multiple partitions such that if one partition is corrupted or problematic, the defaults parameters can still be booted from another partition of the data store.

In some embodiments, if the device determines that the downloaded software is incorrect (e.g., corrupted) or that the installation of the software had an error, then the device can retry the download and/or installation of the software. The device can obtain confirmation from the user to attempt to retry or do so automatically.

Figure 5:
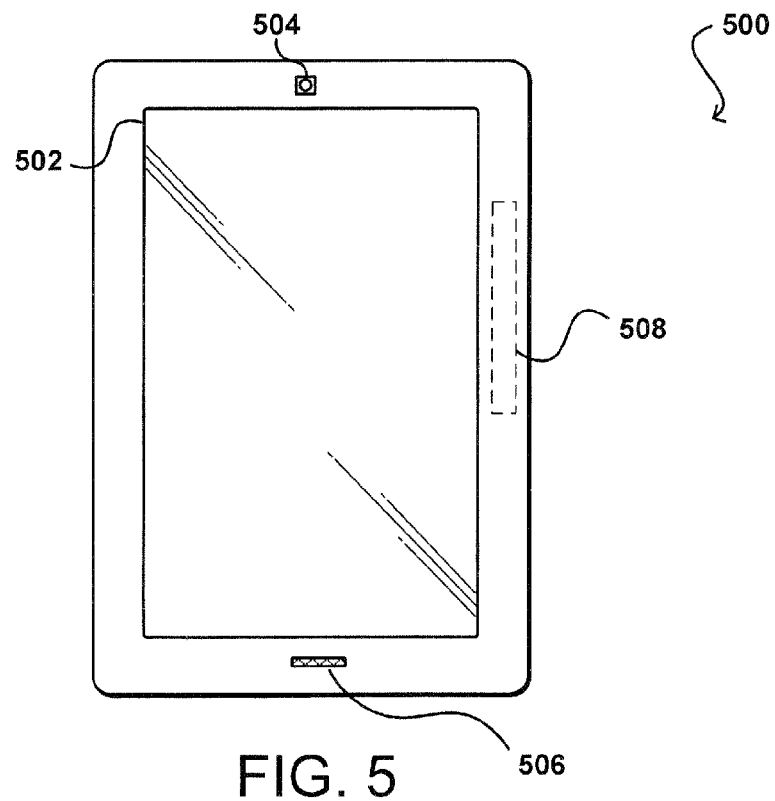
FIG. 5 illustrates an example device that can be used to implement aspects of the various embodiments.

FIG. 5 illustrates an example electronic user device 500 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 500 has a display screen 502 on the front side, which under normal operation will display information to a user facing the display screen (e.g., on the same side of the computing device as the display screen). The computing device in this example includes at least one camera 504 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 500 also includes at least one microphone 506 or other audio capture device capable of capturing audio data, such as words or commands spoken by a user of the device. In this example, a microphone 506 is placed on the same side of the device as the display screen 502, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 500 also includes at least one orientation sensor 508, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 6:
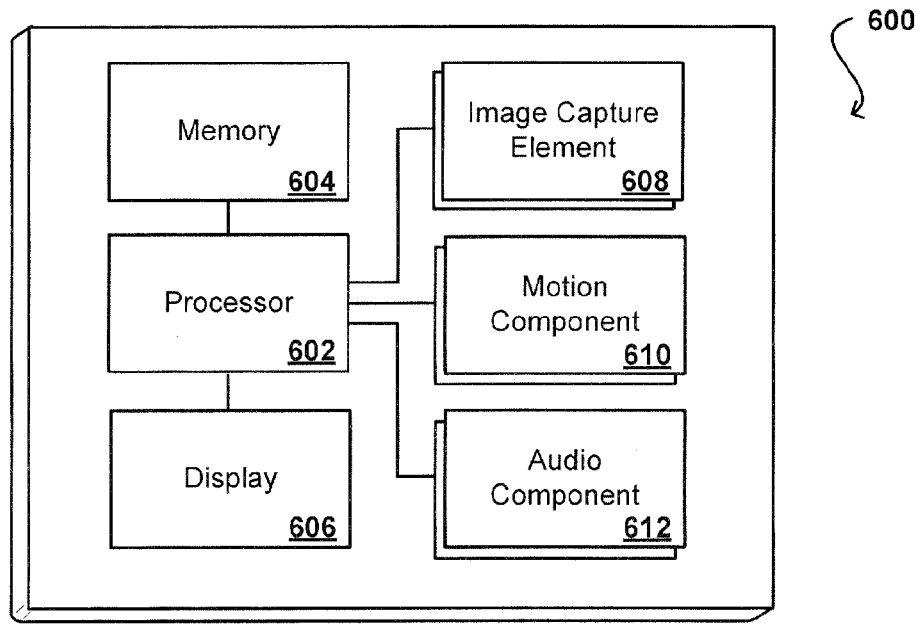
FIG. 6 illustrates example components of a client device such as that illustrated in FIG. 5.

FIG. 6 illustrates a logical arrangement of a set of general components of an example computing device 600 such as the device 500 described with respect to FIG. 5. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one image capture element 608 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 612, such as a mono or stereo microphone or microphone array, operable to capture audio information from at least one primary direction. A microphone can be a uni- or omni-directional microphone as known for such devices.

In some embodiments, the computing device 600 of FIG. 6 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 600 also can include at least one orientation or motion sensor 610. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 602, whereby the device can perform any of a number of actions described or suggested herein.

As an example, a computing device such as that described with respect to FIG. 5 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 7:
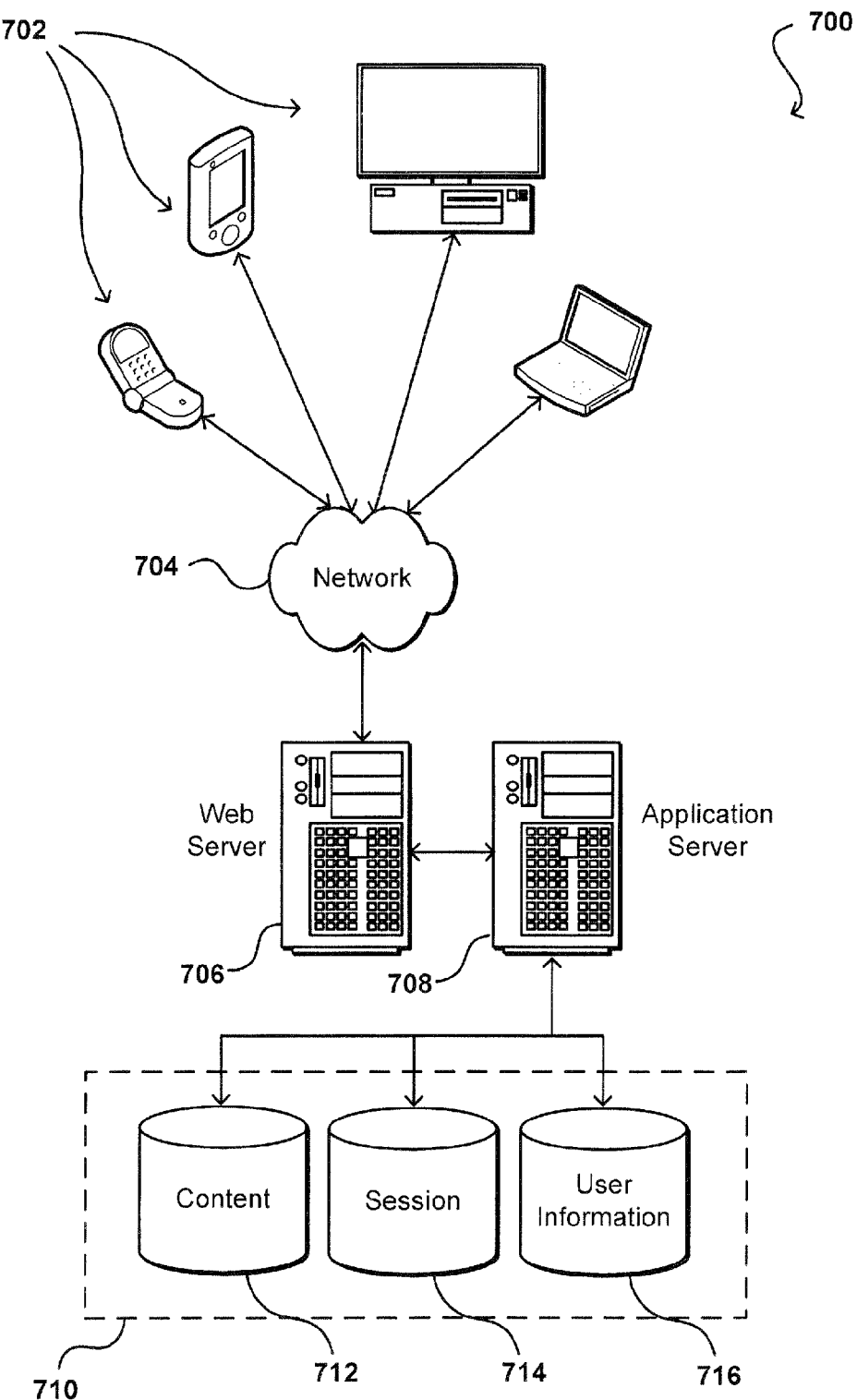
FIG. 7 illustrates an environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 702. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
   storing at least one of content data, index data, profile data, or preference data in a memory device of a computing device;
   storing a first operating system in a first partition of the memory device;
   performing one or more computing tasks using the first operating system in the first partition, the one or more computing tasks involving at least one of the content data, the index data, the profile data, or the preference data;
   storing a second operating system in a second partition of the memory device;
   receiving, over a wireless communication network, a software update for the second operating system in the second partition while at least one of the one or more computing tasks are concurrently performed utilizing the first partition, wherein the receiving of the software update into the second partition appears, to a user of the computing device, to be autonomous from the performance of the one or more computing tasks using the first operating system;
   installing the software update for the second operating system in the second partition while at least one of the one or more computing tasks are concurrently performed utilizing the first partition, wherein the installation of the software update appears, to the user, to be autonomous from the performance of the one or more computing tasks using the first operating system; and
   enabling the computing device to boot using the second operating system in the second partition subsequent to the installation of the software update for the second operating system.

2. The computer-implemented method of claim 1, further comprising:
   enabling the computing device to reboot using the first operating system in the first partition when there is a problem with the second operating system.

3. The computer-implemented method of claim 1, wherein the at least one of content data, index data, profile data, or preference data is stored in one or more memory locations in at least one of the first partition or the second partition.

4. The computer-implemented method of claim 1, wherein the second operating system in the second partition prior to the installation of the software update is a copy of the first operating system in the first partition.

5. The computer-implemented method of claim 1, wherein the second operating system in the second partition after installation of the software update is an upgraded version of the first operating system in the first partition.

6. A computer-implemented method comprising:
performing one or more computing tasks using a first operating system, the first operating system being stored in a first partition of a memory device of a computing device;
receiving, over a communication network, a software for a second operating system in a second partition of the memory device while at least one of the one or more computing tasks are concurrently performed utilizing the first partition, wherein the receiving is independent of the performance of the one or more computing tasks using the first operating system in the first partition; and
installing the software for the second operating system in the second partition while at least one of the one or more computing tasks are concurrently performed utilizing the first partition, wherein the installation is independent of the performance of the one or more computing tasks using the first operating system in the first partition.

7. The computer-implemented method of claim 6, further comprising:
enabling the computing device to boot using the first operating system in the first partition or the second operating system in the second partition, wherein the computing device is able to be rebooted using the first operating system when there is a problem with the second operating system.

8. The computer-implemented method of claim 7, wherein the enabling of the computing device to boot using the first operating system or the second operating system occurs during at a reboot of the computing device.

9. The computer-implemented method of claim 7, wherein whether the computing device boots using the first operating system or the second operating system is dependent upon a selection by a user of the computing device.

10. The computer-implemented method of claim 6, wherein the second operating system in the second partition prior to the installation of the software is a copy of the first operating system in the first partition.

11. The computer-implemented method of claim 6, wherein the second operating system in the second partition after installation of the software is an upgraded version of the first operating system in the first partition.

12. The computer-implemented method of claim 6, wherein after successful installation of the software for the second operating system in the second partition, the first operating system is capable of receiving and installing a future software update, and wherein the computing device can switch to using the first operating system when the future software update is received and installed.

13. The computer-implemented method of claim 6, wherein the second operating system is deleted when there is a problem with at least one of operating the computing system using the second operating system or installing the second operating system, and the computing device reverts back to using the first operating system.

14. The computer-implemented method of claim 6, further comprising:
enabling the computing device to boot into a safe mode utilizing a set of default parameters, wherein an option to boot into the safe mode is made available when booting using the second operating system after the installation of the software and wherein the set of default parameters is stored in at least one of the first partition or the second partition.

15. The computer-implemented method of claim 6, wherein each of the receiving and installing of the software is initiated automatically or by a user of the computing device.

16. The computer-implemented method of claim 6, wherein data integrity of information stored in one of the partitions is maintained when there is a problem with another partition and wherein the maintaining of the data integrity of the information utilizes at least one of error detection, a checksum, a hash sum, data recovery, hardware correction, or software correction to preserve accuracy of the information.

17. The computer-implemented method of claim 6, wherein the communication network is at least one of a wireless cellular data network, a WiFi network, or a wired communication network.

18. The computer-implemented method of claim 6, wherein the software is received over the communication network as an over-the-air (OTA) software update.

19. A computing device, comprising:
a processor; and
a memory device including a first partition, a second partition, and instructions that, when executed by the processor, cause the computing device to:
perform one or more computing tasks using a first operating system, the first operating system being stored in the first partition of the memory device;
receive, over a communication network, a software for a second operating system in the second partition of the memory device while at least one of the one or more computing tasks are concurrently performed utilizing the first partition, wherein the receiving is independent of the performance of the one or more computing tasks using the first operating system in the first partition; and
install the software for the second operating system in the second partition while at least one of the one or more computing tasks are concurrently performed utilizing the first partition, wherein the installation is independent of the performance of the one or more computing tasks using the first operating system in the first partition.

20. The computing device of claim 19, wherein the instruction further cause the computing device to boot using the first operating system in the first partition or the second operating system in the second partition, wherein the computing device is able to be rebooted using the first operating system when there is a problem with the second operating system.

21. The computing device of claim 19, further comprising:
a wireless communication transceiver configured to transmit and receive information associated with the receiving of the software for the second operating system, wherein the communication network is a wireless communication network.

22. The computing device of claim 19, wherein the second operating system in the second partition after installation of the software is an upgraded version of the first operating system in the first partition.

23. The computing device of claim 19, wherein the instructions further cause the computing device to boot into a safe mode utilizing a set of default parameters, wherein an option to boot into the safe mode is made available when booting using the second operating system after the installation of the software and wherein the set of default parameters is stored in at least one of the first partition or the second partition.

24. A non-transitory computer-readable storage medium including instructions for identifying elements, the instructions when executed by a processor of a computing device causing the computing device to:
- perform one or more computing tasks using a first operating system, the first operating system being stored in a first partition of a memory device of the computing device;
- receive, over a communication network, a software for a second operating system in a second partition of the memory device while at least one of the one or more computing tasks are concurrently performed utilizing the first partition, wherein the receiving is independent of the performance of the one or more computing tasks using the first operating system in the first partition; and
- install the software for the second operating system in the second partition while at least one of the one or more computing tasks are concurrently performed utilizing the first partition, wherein the installation is independent of the performance of the one or more computing tasks using the first operating system in the first partition.

25. The non-transitory computer-readable storage medium of claim 24, wherein the instructions further cause the computing device to boot using the first operating system in the first partition or the second operating system in the second partition, wherein the computing device is able to be rebooted using the first operating system when there is a problem with the second operating system.

* * * * *